Figure 1:
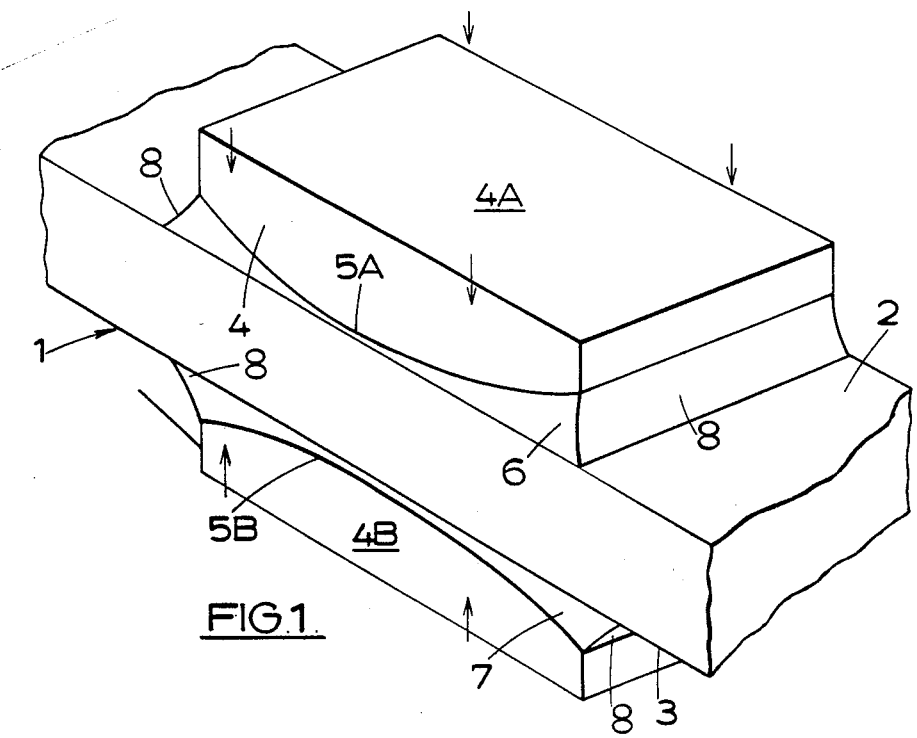

United States Patent [19]

Bellingham

[11] Patent Number: 4,969,634
[45] Date of Patent: Nov. 13, 1990

[54] ATTACHMENT OF COMPONENTS TO COMPOSITE MEMBERS

[75] Inventor: Richard M. Bellingham, Clwyd, Wales

[73] Assignee: Rubery Owen-Rockwell Limited, Wednesbury, England

[21] Appl. No.: 354,820

[22] Filed: May 22, 1989

[30] Foreign Application Priority Data

May 24, 1988 [GB] United Kingdom ................. 8812310

[51] Int. Cl.$^5$ ........................ F16F 1/26; B60G 11/10
[52] U.S. Cl. ...................................... 267/52; 267/49; 267/260; 267/262
[58] Field of Search ....................... 267/52, 37.1, 37.2, 267/37.3, 37.4, 260, 269, 270, 268, 50, 47, 49, 148, 149

[56] References Cited

U.S. PATENT DOCUMENTS

| | | | |
|---|---|---|---|
| 5,490 | 7/1873 | Dean | 267/52 |
| 3,250,546 | 5/1966 | Allison | 267/269 |
| 4,643,406 | 2/1987 | Mounier-Poulat et al. | 267/52 |
| 4,750,718 | 6/1988 | Nickel | 267/49 |
| 4,781,364 | 11/1988 | Finn et al. | 267/260 |
| 4,801,129 | 1/1989 | Wells | 267/52 |

FOREIGN PATENT DOCUMENTS

| | | | |
|---|---|---|---|
| 16824 | 11/1916 | United Kingdom | 267/37.4 |
| 2128714 | 5/1984 | United Kingdom | |

*Primary Examiner*—Matthew C. Graham
*Attorney, Agent, or Firm*—Scrivener and Clarke

[57] ABSTRACT

When attaching components to composite members, for example leaf springs of composite fibre reinforced resin material, it is necessary to avoid stress concentrations and also the access of foreign matter between the spring and the component since this can cause abrasion and break down of the spring. A composite leaf spring having upper and lower planar surfaces has a two element component clamped to it as indicated by the arrows. Liners of elastomeric material are interposed between one element and the upper planar surface and between the other element and the lower planar surface. Towards their ends the surfaces of the elements adjacent the spring diverge from the spring and the liners are shaped to fill the divergencies. The liners extend beyond the ends of the elements to form sealing lips at the spring surfaces. In an eye end attachment at an end of a composite spring in a one piece component may be used.

10 Claims, 4 Drawing Sheets

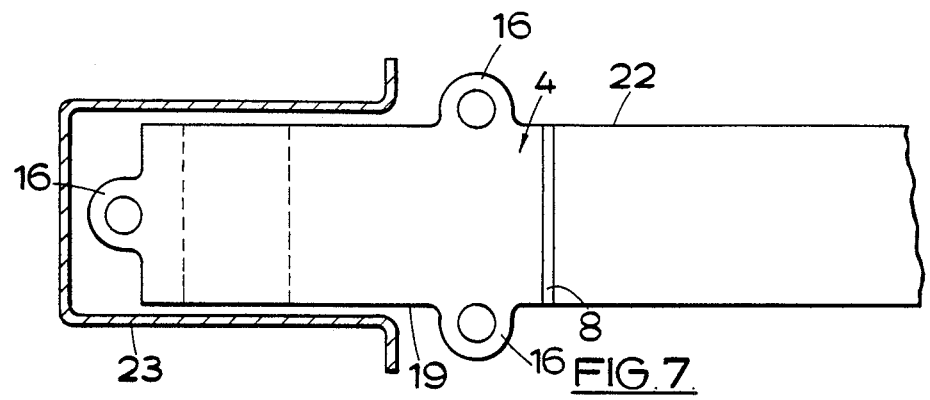
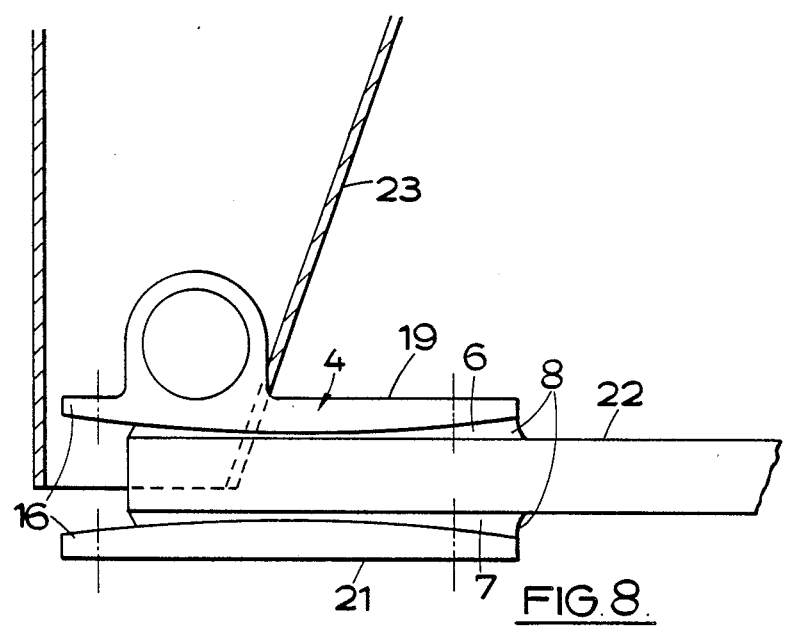

ATTACHMENT OF COMPONENTS TO COMPOSITE MEMBERS

This invention relates to the attachment of components to members made of composite fibre reinforced synthetic resin material (hereinafter referred to as "composite members") and is primarily concerned with attachment of components to such composite members which flex in use, for example leaf springs on automotive vehicles. Thus, this invention concerns an assembly of a component and a composite member wherein the composite member has first and second opposed, spaced, generally planar surfaces and the component has two surfaces, each of which is associated with a respective planar surface. Such an assembly is hereinafter referred to as "an assembly of the type described".

Various methods have been tried for the attachment of end fittings and axle mounts to leaf springs of composite fibre reinforced synthetic resin material (hereinafter referred to as "composite springs"). A bolted construction may be satisfactory in relatively low load and stress applications but generally this is undesirable because longitudinal fibres of the spring are severed at the bolt holes, reducing the strength of the spring and providing discontinuities from which cracks can start and spread. In consequence, the tendency is to secure end fittings and axle mounts by clamping them to the spring.

In designing such bolting or clamping arrangements care has to be taken to avoid creating stress concentrations on the spring which could lead to premature failure. One such design is described in British Patent No. 2 128 714 of Rubery Owen Holdings Limited.

Arising from these attachment methods a problem has been experienced in that, in use, ingress of abrasive matter can occur which becomes entrapped between the fitting or mount — which is rigid — and the spring, which flexes. This can cause abrasion of the surface of the spring and bring about failure due to cracking at the surface of the spring leading to delamination and fracture.

According to the present invention there is provided an assembly comprising a composite member of composite fibre reinforced synthetic resin material having first and second opposed, spaced, generally planar surfaces, a component having first and second surfaces respectively associated with and diverging from said first and second planar surfaces, first and second liners of wedge-like shape respectively engaged between said first planar surface and said first associated surface and between said second planar surface and said second associated surface thereby to fill the divergencies between said surfaces of said component and said composite member, said liners being of elastomeric material and, where they engage said planar surfaces, having sealing lips extending beyond said associated surfaces to inhibit access of foreign matter between said liners and said planar surfaces, and clamping means acting on said component whereby said component, liners and composite member are clamped together.

The component may comprise a single element incorporating two surfaces to be associated with the corresponding planar surfaces of the composite member. Such a component may enclose an end of a composite member.

In an alternative construction, the component comprises two elements, each element having a surface associated with a respective planar surface of the composite member. The said surfaces of such a component may have two ends, each of which diverges from the corresponding planar surface of the composite member. The liners used with this construction may be of a double wedge-like shape to fill both divergencies and provide a sealing lip at each end. A suitable material for the liner is polyurethane.

When a component is fitted to an end of a composite member, such as a leaf spring, the first and second liners may be integral with one another and encompass the end of the composite member, so giving protection to the end of the composite member against damage in use.

Figure 2:
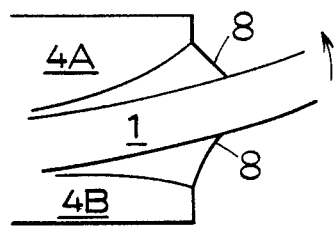
Figure 3:
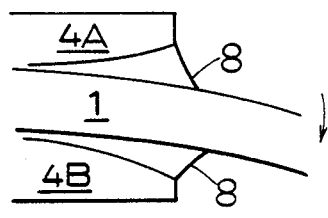
Figure 4:
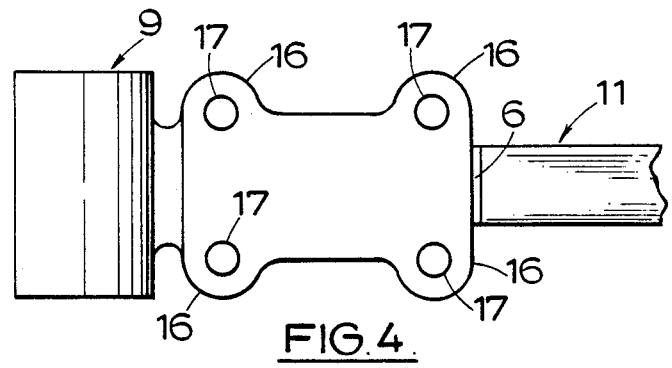
Figure 5:
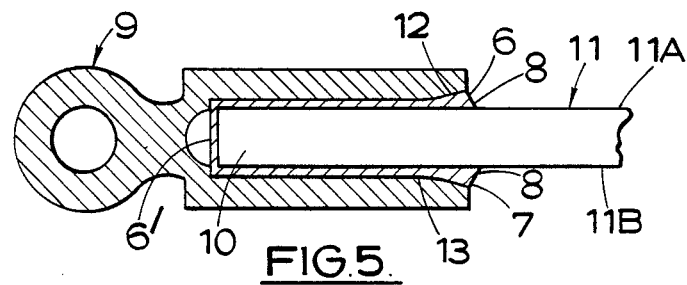
Figure 6:
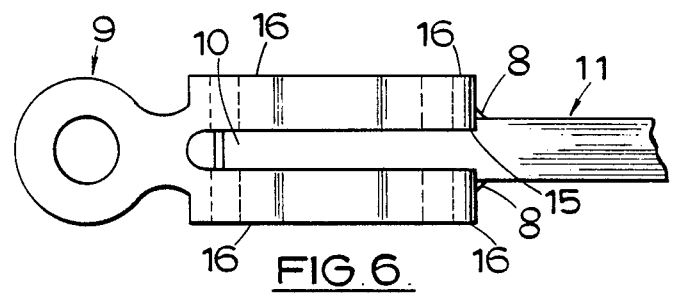
Figure 9:
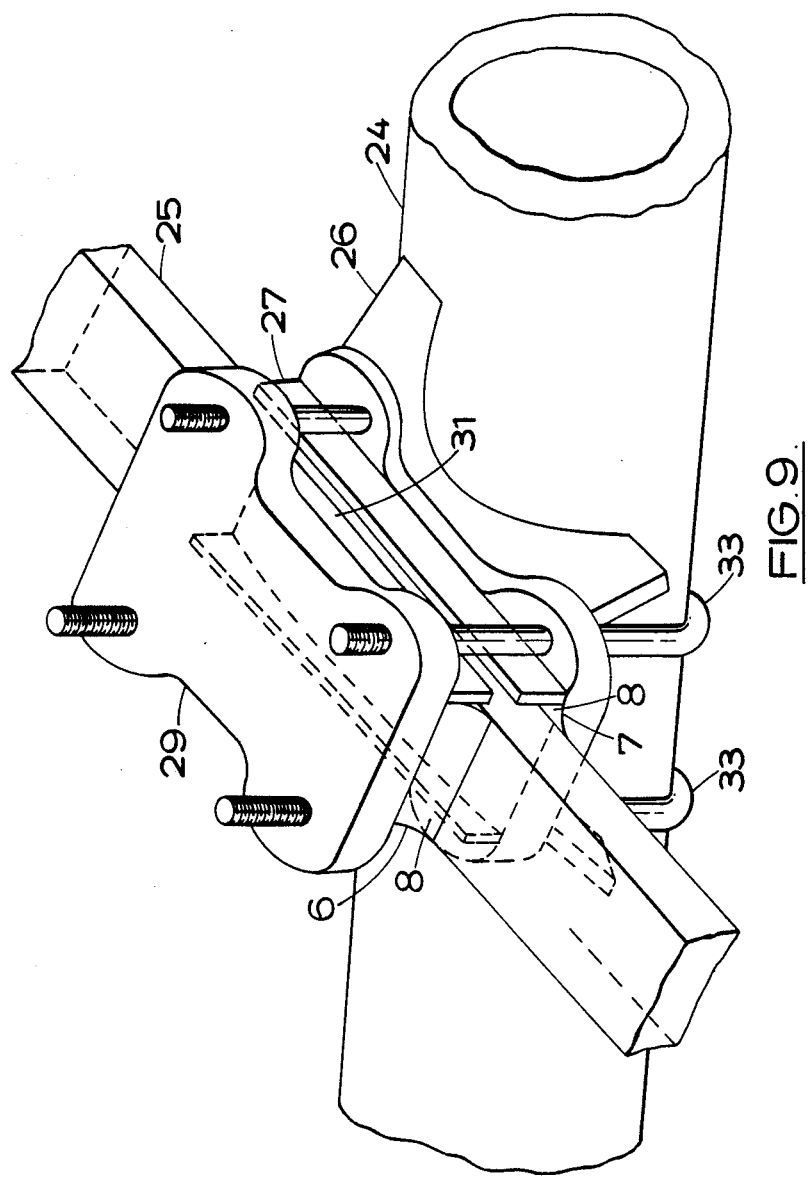

Embodiments of the invention will be described by way of example with reference to the accompanying drawings in which:

FIG. 1 is a schematic view in perspective of a two element component, a composite member and two liners in assembled relationship, FIGS. 2 and 3 are scrap side views of the assembly of FIG. 1 showing the composite member in upwardly and downwardly flexed positions respectively and the corresponding flexure of the liners, FIGS. 4, 5 and 6 show a one element component, integral liners and composite member in assembled relationship in plan, sectioned side elevation and side elevation respectively, FIGS. 7 and 8 are plan and side elevations respectively showing a two element component and two liners in assembled relationship at an end of a composite spring and a support bracket, and FIG. 9 is a perspective view showing an axle beam in assembled relationship with a composite spring, two liners and a two element component.

Referring to FIGS. 1 to 3 of the accompanying drawings, a composite member in the form of a composite leaf spring 1 has opposed, spaced, generally planar surfaces 2 and 3. A component 4 comprises upper and lower elements 4A,4B, each of which has a convex surface 5A,5B so that the ends of these surfaces diverge from the planar surfaces 2,3 to reduce stress concentration thereon in use. When assembled the convex surface 5A is associated with the one planar surface 2 and the other convex surface 5B is associated with the other planar surface 3. Liners 6 and 7 of elastomeric material are interposed between surfaces 2,5A and 3,5B respectively. Each liner has opposed surfaces, one of which is flat to conform with a planar surface, as 2,3, and the other of which is concave to conform to the convexity of a surface, as 5A, 5B. Each liner has two sealing lips 8 which extend beyond the elements 4A,4B along the planar surfaces 2,3. As seen, the liners fill the divergencies between the elements 4A,4B and leaf spring 1. The action of the sealing lips 8 when the leaf spring 1 flexes is seen in FIGS. 2 and 3. They remain in contact with the planar surfaces 2,3 to prevent ingress of foreign matter.

Referring again to FIG. 1, arrows indicate the lines of action of clamping members, for example bolts, for securing the assembly.

Referring now to FIGS. 4,5 and 6, a one element component comprises an eye end 9 on an end 10 of a composite leaf spring 11. Inboard of the end 10 of the spring 11 inner surfaces 12,13 of the eye end 9 diverge from the upper and lower surfaces 11A,11B respectively of the spring. Elastomeric liners 6,7 between the inner surfaces 12,13 and the upper and lower surfaces 11A,11B of the spring are in this case shown as being integral with one another and having a portion 6' which passes over the end 10 of the spring. The eye end 9 has slots whose sides 15 overlie the sides of the spring 11 to inhibit extrusion of the liners 6, 7 under load. The eye end 9 includes upper and lower lugs 16 with through holes 17 to receive bolts to clamp the eye end and liners to the end of the spring 11. The sealing lips are shown at 8.

FIGS. 7 and 8 of the drawings show a two element component 4 in the form of an eye end having upper and lower elements 19,21 on an end of a composite leaf spring 22, and positioned within a support bracket 23 (shown in section) which may be secured to a vehicle. The construction is generally similar to that of FIG. 1 except that the assembly is clamped together by one bolt, not shown, at lugs 16 at the support bracket end and by two bolts, not shown, at further lugs 16, at the other end. In use, the eye end is pivotally secured to the bracket 23. In this case no restraint against lateral extrusion of the liners 6,7 has been shown. As before the liners have sealing lips 8. The liners, if desired, may be integral as in the FIGS. 4 to 6 construction so as to protect the end of the spring 22 from debris thrown up from the road in use.

In FIG. 9 there is shown an assembly of an axle beam 24 and a composite leaf spring 25. A spring seat 26 is secured to the axle beam 24 as by welding. Its upper part corresponds generally to the lower element 4B of FIG. 1 and includes extrusion restraints 27 for the one liner 6. A top plate 29 corresponds generally to the upper element 4A of FIG. 1 and includes extrusion restraints 31 for the other liner 7. The liners have sealing lips 8 at their opposite ends. The top plate 29, liners 6,7 and leaf spring 25 are clamped to the assembly of the axle beam 24 and spring seat 26 by U bolts 33 which pass through registering holes in the spring seat 26 and top plate 29 and are secured by washers and nuts (not shown).

I claim:

1. An assembly comprising a composite member capable of flexure being of composite fibre reinforced synthetic resin material and having first and second opposed, spaced, generally planar surfaces, a component having first and second surfaces respectively associated with and diverging from said first and second planar surfaces, first and second liners of wedge-like shape respectively located and substantially contained between and engaging with said first planar surface and said first associated surface and between said second planar surface and said second associated surface thereby to fill the divergencies between said surfaces of said component and said composite member, and clamping means acting on said component whereby said component, liners and composite member are clamped together, said liners being of elastomeric material, being retained in engagement with said planar surfaces by the clamping action of said clamping means, and, where they engage said planar surfaces, having sealing lips which extend along said planar surfaces in retained contact therewith beyond said associated surfaces to inhibit access to foreign matter between said liners and said planar surfaces.

2. An assembly as claimed in claim 1 wherein said component comprises a single element having said first and second associated surfaces and assembled to an end of said composite member.

3. An assembly as claimed in claim 2 wherein said component encloses said end of said composite member.

4. An assembly as claimed in claim 2 wherein said second liner is integral with said first liner and extends over said end of said composite member.

5. An assembly as claimed in claim 1 wherein said component comprises two elements which respectively have said first and second associated surfaces.

6. An assembly as claimed in claim 5 wherein each said element extends along said composite member, has opposite ends spaced along said composite member, and towards each said end said associated surface of said element diverges from said respective planar surface, and said liners each have a double wedge-like shape to fill both divergencies between said associated surface of each said element and said respective planar surface and have said sealing lips beyond said associated surface at opposite end of each said element.

7. An assembly as claimed in claim 5 including an axle beam clamped to one of said elements.

8. An assembly as claimed in claim 1 in which said composite member is a leaf spring.

9. An assembly as claimed in claim 1 in which said liners are made of polyurethane.

10. An assembly as claimed in claim 1 in which said component includes means to resist extrusion of said liners laterally of said composite member when in use.

* * * * *